Nov. 6, 1934.  R. S. CONDON  1,979,870
METHOD OF AND MACHINE FOR GRINDING GEARS
Filed March 29, 1934
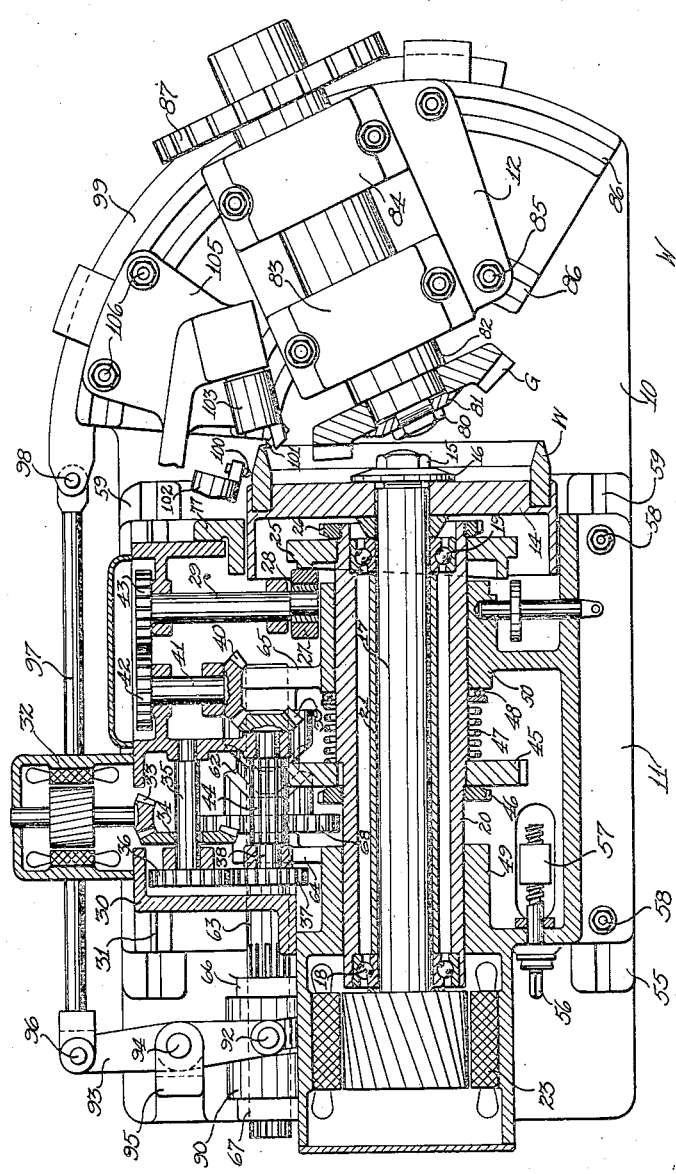
Inventor
Robert S. Condon
By
B. Schlesinger  Attorney Patented Nov. 6, 1934

1,979,870

UNITED STATES PATENT OFFICE 1,979,870

METHOD OF AND MACHINE FOR GRINDING GEARS

Robert S. Condon, Rochester, N. Y., assignor to Gleason Works, Rochester, N. Y., a corporation of New York Application March 29, 1934, Serial No. 718,027

7 Claims. (Cl. 51—52)

The present invention relates to the grinding of longitudinally curved tooth gears such as spiral bevel and hypoid gears and especially to the grinding of gears which have been cut in a forming operation, that is, without generating roll.

The purpose of this invention is to provide a method and machine which will permit the use of an annular grinding wheel in the grinding of such gears.

Spiral bevel and hypoid gears, whether generated or form-cut, are commonly cut with a face-mill gear cutter and it is only natural, therefore, that efforts should be made to grind such gears with an annular grinding wheel, for the annular grinding wheel corresponds directly to the face mill and the same figures and settings of work and tool can therefore be used on the grinding machine as on the cutting machine. Previous attempts to grind form-cut gears with an annular wheel have heretofore, however, only resulted in failure. There has been too intimate a contact between the surfaces of the grinding wheel and the tooth surfaces of the gear to be ground. An annular wheel contacts a form-cut gear not only along the whole length of the tooth surfaces but also along the whole height of the tooth profiles. The too intimate contact between the wheel and the gear tooth surfaces results in "burning" of the tooth surfaces of the gear unless extreme precautions are observed and the finest feeds used. The process, has, therefore, heretofore been commercially unsatisfactory.

In the present invention the tendency of the wheel to burn is overcome by axially reciprocating the wheel rapidly and through a small distance as it is fed into full-depth engagement with the gear. This rapid reciprocation eliminates "burning."

In the drawing:

Fig. 1 is a plan view, partly in horizontal section, illustrating one embodiment of a grinding machine constructed according to the present invention;

Fig. 2 is a fragmentary sectional view, showing a detail of the mechanism for moving the wheel into and out of operative position;

Fig. 3 is an end view of the eccentric which produces the quick, short reciprocating movements of the wheel; and Fig. 4 is a fragmentary diagrammatic view illustrating the grinding process of the present invention.

10 designates the base or frame of the machine. This base serves as a support for the rectilinearly adjustable column 11 and for the angularly adjustable work head 12. The column 11 carries the grinding wheel W and the work head carries the gear G to be ground.

The annular grinding wheel W is mounted in any usual or suitable manner in a head 14 which may be of cast-iron or steel and which ordinarily will be of sufficient mass to provide a fly-wheel effect when the wheel is rotating. The wheel head 14 is secured by means of the nut 15 and clamping-disc 16 to the tool spindle 17. This spindle 17 is rotatably journaled in a sleeve or quill 20 on antifriction bearings 18 and 19. A spacer 21 is interposed between the bearings 18 and 19.

The spindle 17 is directly connected to or integral with the armature shaft of a motor 23 so that the grinding wheel W may be driven directly at high speed by the motor.

There is a face-cam 25 secured against a shoulder on the quill 20 by means of a nut 26. This cam cooperates with a roller 27. The roller 27 is eccentrically mounted, as shown clearly in Fig. 3, by means of a bushing 28 on a shaft 29. The shaft 29 is journaled in a slide 30 which is reciprocable on ways suitably formed on the column 11, one of the ways being indicated at 31 in Fig. 1. The shaft 29 is driven from a motor 32 mounted on the slide 30 through the bevel gearing 33, 34, the shaft 35, the spur gearing 36, 37, the shaft 38, the bevel gearing 39, 40, the shaft 41, and the spur gearing 42, 43. The shafts 35, 38, 41 and 29 are all suitably journaled in the slide 30.

The operating end-face of the cam 25 is so shaped as to impart a gradual in-feed to the grinding wheel as it rotates in engagement with the gear. The cam 25 is keyed, or otherwise fastened, to the sleeve 20 to rotate and slide therewith. The sleeve 20 is driven from the shaft 36 through the long-faced pinion 44 and the spur gear 45. The latter gear is keyed to the sleeve or quill 20. It is held by a nut 46, against a shoulder on the sleeve.

There is a spring 47 interposed between the gear 45 and a thrust-bearing 48 which serves to hold the cam 25 against the roller 27 and also to return the grinding wheel and quill at the end of the forward movement of the cam. The quill is mounted in the bearings 49 and 50 of the column 11. The thrust-bearing 48 bears against one end-face of the bearing 50.

The column 11 is mounted directly on the base 10 and is adjustably rectilinearly thereon in a direction parallel to the axis of the grinding wheel spindle to compensate for wear of the grinding wheel. This adjustment of the column 11 is effected by rotation of the screw-shaft 56 which is journaled in the column and which threads into a nut 57 that is secured to the base. The column is secured in any adjusted position by means of T-bolts 58, which engage in the longitudinal T-slots 59 provided in the upper face of the base.

The slide 30 is reciprocable in a direction parallel to the axis of the grinding wheel spindle 17 for the purpose of alternately feeding the grinding wheel toward and withdrawing it from operative relation with the work. The reciprocating movement of the slide 30 is effected by means of a cam 62.

The cam 62 is secured to a shaft 63 that is journaled in bearings 64, 65, 66 and 67. The bearings 64 and 65 are formed integral with the bearings 49 and 50 already mentioned and project therefrom. The bearings 66 and 67 are integral with the base 10. The shaft 63 is driven from the shaft 38 through the long-faced pinion 44 already referred to and a spur gear 68 which meshes with the pinion 44 and which is keyed or otherwise fastened to the shaft 63.

The cam 62 cooperates with a roller 70 which is secured in a block 73 (Fig. 2) that is resiliently connected to a block 74 by coil-springs 75. The block 74 is fastened by bolts 76 to the upper face of the bottom portion of the slide 30, the roller 70 being directly underneath the cam 62.

A positive stop is provided to limit the forward feed movement of the slide 30 so as to insure accurate positioning of the grinding wheel at the end of each feed stroke. This stop consists of a lug or projection 77 formed on the column 11 in position to engage the forward wall of the slide 30 and limit its forward movement. Since the lug 77 is integral with the column 11 it is automatically adjusted on adjustment of the column 11 to allow of feed of the grinding wheel to correct depth regardless of wear of the wheel.

The positioning of this stop 77 close to the point of engagement of the grinding wheel with the work and the mounting of the cam 25 immediately behind the grinding wheel are constructional features worthy of note for they permit close control of the feed of the grinding wheel and elimination of vibration during the feed.

The gear G to be ground is secured as by means of a nut 80 and a clamping-disc 81 to the work spindle 82 of the machine. This spindle is journaled in bearings 83 and 84 in the work-head 12. The work-head is adjustable angularly on the base of the machine as previously mentioned, in order to adjust the gear into correct operative relation with the grinding wheel in accordance with the pitch-cone angle of the gear to be ground. The work-head is secured in any adjusted position by means of T-bolts 85 which engage in the arcuate T-slots 86 formed in the upper face of the base or frame 10.

Any suitable type of index mechanism may be employed for indexing the work. For the purpose of illustration, the machine has been shown as equipped with a notched-plate index mechanism of the type disclosed in U. S. Patent No. 1,351,200 of April 31, 1920. The notched-plate 87 forming part of this indexing mechanism is secured to the work spindle 82. The indexing mechanism may be actuated, as in the machine of the patent referred to, from a cam through a reciprocating rail. In the drawings of the present machine, the cam is denoted at 90. It has a splined connection with the shaft 63 so as to permit adjustment of the column 11 relative to the base 10 and is held against axial movement between the bearings 66 and 67 already referred to.

The cam 90 engages a roller 92 which is mounted on one end of a lever 93 that is pivoted at its center 94 between the ears of an arm 95 that is formed integral with the base of the machine. The outer end of the lever 93 is connected by means of a pin 96, link 97, and pin 98 with a reciprocating rail 99.

As this type of indexing mechanism is fully described in Patent No. 1,351,200 above mentioned, it is not necessary to describe it in further detail here. Suffice it to say that it operates to hold the work spindle and the work stationary during grinding and to index the work after the grinding wheel has been withdrawn from operative position.

The gearing driving the sleeve or quill 20 is so selected that this quill and the cam 25 mounted thereon rotate at a relatively slow rate compared to the rates of rotation of the grinding wheel W and of the eccentric 27. The cam 25 is so formed that in one revolution the rotating grinding wheel will be fed from the top to the root of a tooth space of the gear being ground. Of course, during the whole of this movement, the grinding wheel will also be reciprocating due to the action of the eccentric roller 27 on the cam 25.

The cam 62 moves the slide 30 and, through the eccentric roller 27 and cam 25, moves the quill 20 and grinding wheel W. The cam 62 is so formed and so driven that through the means described, it moves the slide 30 from a position where the grinding wheel is fully clear of the work to a position where it will contact the top of a tooth of the work, and then allows of a dwell during which the grinding wheel is moved from top to root of the tooth space by the cam 25, and then withdraws the grinding wheel to inoperative position again.

The cam 90 is so formed as to operate the indexing mechanism of the machine during the periods that the grinding wheel is withdrawn from the work by the cam 62, and reset this index mechanism during the in-feed movements of the grinding wheel under actuation of this cam 62.

The indexing operation and the feed and withdrawing operations of the wheel under actuation of the cam 62 can be effected quite rapidly and there need be only slight dwell in the track of the cam 25 to correspond to the period of feed and withdrawal of the wheel under actuation of the cam 62. In fact, the dwell in the cam 25 might be omitted entirely and this cam constructed so as to feed continuously. In this latter event, the sleeve 20 might begin a new feed movement while the grinding wheel was still withdrawn from operative position.

In the operation of the machine the grinding wheel is rotated continuously from the motor 23 and it is reciprocated continuously from the eccentric 27 which cooperates with the cam 25. The grinding wheel is brought into operative relation with the work by the cam 62 and then the grinding wheel is slowly fed into full depth engagement with the gear by operation of the cam 25, the grinding wheel reciprocating axially during the whole of this slow feed movement because it is an eccentric 27 which engages the cam 25. When full depth position is reached, the spring 47 operates to withdraw the grinding wheel outwardly until the grinding wheel just clears the tip of the tooth or teeth upon which it has been operating and then the cam 62 withdraws it wholly from engagement from the work. Then the indexing mechanism is actuated by the cam 90 to bring a new tooth surface or tooth space of the work into position to be ground and the cycle begins anew. One or both sides of a tooth space of the gear may be ground at a time, as may be desired.

The rapid reciprocation and slow feed of the grinding wheel into depth through use of the eccentric 27 and cam 25 prevent dwell of the wheel too long at any point on the tooth surface or tooth surfaces being ground and effectively prevent "burning" of the tooth surface or surfaces. Two positions of the grinding wheel at the limits of throw of the eccentric 27 are shown in full and dotted lines, respectively, in Fig. 4. These are the positions which the wheel occupies under actuation of the eccentric 27 when the cam 25 through the eccentric has moved the wheel into full depth engagement with the work.

The two sides of the wheel may be dressed by a pair of diamonds 100 and 101 which are carried on plungers or pistons 102 and 103, respectively, that are reciprocated to effect the dressing operation. The pistons or plungers 102 and 103 are reciprocably mounted on a support or bracket 105 which is angularly adjustable on the base 10 of the machine and which can be secured in any adjusted position by means of T-bolts 106, the heads of which engage in the T-slots 86 already mentioned. The plungers and pistons, 102 and 103 may be reciprocated hydraulically or mechanically as desired.

While a particular embodiment of the invention has been described, this application is intended to cover any variations, uses, or adaptations of the invention following, in general, the principles of the invention and including such departures from the present disclosure as come within known or customary practise in the gear art, and as may be applied to the essential features hereinbefore set forth and as fall within the scope of the invention or the limits of the appended claims.

Having thus described my invention, what I claim is:

1. In a machine for grinding longitudinally curved-tooth gears, a tool spindle, a work spindle, an annular grinding wheel secured to the tool spindle, means for reciprocating the tool spindle axially, means for producing an alternate forward and backward movement of the wheel relative to the work, respectively, to bring the wheel into operative position and withdraw the same therefrom, and means for indexing the work spindle during the periods of withdrawal.

2. In a machine for grinding longitudinally curved-tooth gears, a tool spindle, a work spindle, an annular grinding wheel secured to the tool spindle, a sleeve in which the tool spindle is journaled, a cam secured to the sleeve, an eccentrically mounted roller in operative engagement with said cam, means for rotating said roller, means for rotating said sleeve, and means for rotating the tool spindle.

3. In a machine for grinding longitudinally curved-tooth gears, a tool spindle, a work spindle, an annular grinding wheel secured to the tool spindle, a sleeve in which the tool spindle is journaled, a cam secured to the sleeve, a slide reciprocable relative to the sleeve in a direction parallel to the axis of the tool spindle, a shaft journaled in the slide, a roller eccentrically mounted on said shaft in operative engagement with said cam, means for rotating said shaft, means for rotating said sleeve, means for rotating the tool spindle, means for imparting an alternate forward and backward movement to the slide respectively, to bring the wheel into operative position and withdraw the same therefrom, and means for indexing the work spindle during the periods of withdrawal.

4. In a machine for grinding longitudinally curved-tooth gears, a work spindle, a tool spindle, a rotary annular grinding wheel mounted on said tool spindle and having grinding surfaces complementary in profile to the tooth surfaces to be ground, means for rotating the tool spindle, means for producing a gradual feed movement of the wheel into full-depth engagement with the work, means for producing a rapid reciprocating movement of the wheel axially during said movement, and means for periodically indexing the gear.

5. The method of grinding the tooth surfaces of a longitudinally curved-tooth gear which comprises engaging with the gear an annular grinding wheel whose profile-shape is complementary to the profile shape of the tooth surfaces to be ground, and rotating said wheel in engagement with the gear while producing a relative reciprocating movement between the wheel and gear in a direction axial of the wheel.

6. The method of grinding the tooth surfaces of a longitudinally curved-tooth gear which comprises rotating an annular grinding wheel, whose profile shape is complementary to the profile shape of the tooth surfaces to be ground, in engagement with a gear while producing a relatively slow feed movement of the grinding wheel into full-depth engagement with the gear and simultaneously reciprocating the grinding wheel axially at a relatively rapid rate.

7. The method of grinding the tooth surfaces of a longitudinally curved-tooth gear whose tooth surfaces are of straight profile, which comprises engaging with the gear an annular grinding wheel having grinding surfaces of straight profile complementary to those of the gear, and rotating said wheel in engagement with the gear and, while feeding the wheel into full-depth engagement with the gear, effecting short, rapid reciprocating movements of the wheel axially.

ROBERT S. CONDON.